3,357,843
REFRACTORY BONDING COMPOSITION
Jan Bowman, Los Gatos, Calif., assignor to Kaiser Aluminum & Chemical Corporation, Oakland, Calif., a corporation of Delaware
No Drawing. Filed Jan. 10, 1966, Ser. No. 519,529
12 Claims. (Cl. 106—58)

ABSTRACT OF THE DISCLOSURE

A refractory composition consisting essentially of a refractory aggregate, from 0% to 2% by weight plasticizer and, as a cold setting bond, monosodium phosphate and from 10% to 200%, based on the weight of monosodium phosphate present, of a glassy polyphosphate having the general type formula $M_{n+2}P_nO_{3n+1}$, where M is an alkali metal and $n$ is an integer equal to or greater than 3, the composition also containing a finely divided reactive alkaline earth metal oxide compound.

---

This invention concerns refractory compositions and particularly such compositions adapted to being gunned into place.

It is known to use monosodium dihydrogen phosphate ($NaH_2PO_4$) together with a reactive finely divided alkaline earth metal oxide containing compound, for example magnesia, as a bond for refractory compositions. It has been discovered that refractory compositions so bonded are well adapted to placement by the gunning technique wherein refractory material is projected, for example by compressed air, through a gun nozzle and admixed with water just prior to ejection from the nozzle. The good gunning characteristics of such compositions are due to the fast bond and good sticking properties developed by the monosodium phosphate. These characteristics are particularly evident when the compositions are gunned onto a hot furnace wall.

It is believed that monosodium phosphate (MSP) reacts with alkaline earth metal oxide containing material (e.g., magnesia) to form a hydrated alkaline earth metal acid phosphate, as is more fully set forth in my co-pending application SN. 459,919, filed may 28, 1965. Upon heating the monosodium phosphate bonded refractory, these hydrated products tend to decompose, losing their water of hydration. Accordingly, it has been found necessary to carefully control the amount and sizing of the fine magnesia, or other reactive alkaline earth metal oxide containing compound, in order to prevent explosion or popping of the gunned refractory upon heating. One solution to this problem, proposed in the aforesaid application SN. 459,919, is to limit the amount of finely divided, e.g., —100 mesh, magnesia or other reactive alkaline earth metal oxide material, and to replace part of the finely divided magnesia commonly used in a refractory composition with a finely divided nonreactive material, for example chrome ore. However, it has been found that such replacement of the fine magnesia by fine chrome ore results in a loss of strength of the refractory composition, particularly at elevated temperatures. Also, the expedient of adding chrome ore is not useable in preparing a high magnesia (e.g., over 85 to 90% MgO) refractory composition. Accordingly, other means of inhibiting the explosion or popping tendency of monosodium phosphate bonded refractories have been sought.

It has now been discovered, according to this invention, that it is possible to inhibit the explosion tendencies of a refractory composition consisting essentially of refractory aggregate and, as cold setting bonding agent, $NaH_2PO_4$ and a finely divided, reactive alkaline earth metal oxide containing compound, for example magnesia, by incorporating in such composition a glassy polyphosphate in an amount from 10% to 200% of the weight of the $NaH_2PO_4$.

It will be understood that the bonding materials, particularly the phosphate materials, will be limited to the amount needed to provide an effective bond. For example, a suitable refractory composition can contain from 1% to 5% by weight monosodium phosphate, from about 5% to about 35% by weight of finely divided magnesia or other reactive alkaline earth metal oxide material, and from 0.1% to 2% by weight of glassy polyphosphate, the balance of the composition being refractory aggregate. In general, it will be found desirable to limit the total amount of phosphate, calculated as $P_2O_5$, in the refractory composition to not more than 3% $P_2O_5$ by weight of the total composition. Generally, it will be found desirable to secure the good bonding characteristics of monosodium phosphate by using as much of this material as possible and using the minimum amount of glassy polyphosphate required to inhibit explosion or popping of the composition.

The refractory aggregate can be any such material. Although the bond of this invention has been found particularly useful with basic or nonacid refractories such as periclase, chromite, and mixtures of these with each other, it can also be used with deadburned dolomite, alumina, ganister (essentially $SiO_2$), and other refractory materials.

The finely divided, reactive alkaline earth metal oxide containing material will preferably substantially all pass a 100 mesh screen and can be magnesia (MgO), lime (CaO), mixtures of these such as dolomite, or any such material which will react with monosodium phosphate to form a bond, again as is more fully set forth in aforesaid application SN. 459,919.

The glassy polyphosphates used in the practice of this invention are materials having the general type formula $M_{n+2}P_nO_{3n+1}$, where M represents an alkali material such as sodium, potassium, and the like, and $n$ is an integral equal to or greater than 3. It will be understood that the glassy polyphosphates commercially available are generally a mixture of compounds having different values of $n$ in the type formula. These commercial glassy polyphosphates are often characterized by the average value of $n$, sometimes referred to as the chain length of phosphorous atoms. While relatively long chain length materials, for example those having an average chain length of 26–30, can be used in the practice of this invention, it has been found that the use of such long chain polyphosphates, while it does inhibit the popping or explosion tendencies of the MSP bond, does tend to decrease the strength of the refractory compositions, particularly at elevated temperatures. Accordingly, it is preferred to use a glassy polyphosphate having an average chain length of about 6. One such material is sold by Monsanto Chemical Company under the trade name "SQ" phosphate and has an average chemical composition corresponding to $Na_8P_6O_{19}$. It will be understood that most commonly the sodium glassy polyphosphates will be used for reasons of economy and availability. By the term "glassy" is meant amorphous or non-crystalline material, more fundamentally, material in which the atoms are arranged randomly rather than regularly as in a grid or lattice, and which, for example, does not exhibit an X-ray diffraction pattern characteristic of crystalline materials and consisting of discrete diffraction peaks.

It will frequently be found advantageous to incorporate in compositions according to this invention, particularly when they are to be applied by the gunning technique, a small amount of plasticizer, for example from 1% to 2% by weight of a plastic clay such as bentonite.

Among the advantages of compositions according to this invention are that they gun well without clogging, they stick well to the target surface, particularly when such surface is a heated furnace wall, they show low dusting and low rebound, thus providing a dust-free working area and reducing waste material, and they show good strength after setting, particularly good strength at elevated temperatures, e.g., at 1260° C.

*Example 1*

A refractory composition containing 27 parts periclase passing a 6 mesh screen and retained on a 20 mesh screen and 25.4 parts of the same periclase passing a 100 mesh screen, 42.9 parts Masinloc chrome ore passing a 10 mesh screen and retained on a 100 mesh screen, 2.5 parts $NaH_2PO_4$, 0.7 part "SQ" sodium polyphosphate, and 1.5 parts bentonite was gunned through a Ridley gun onto a vertical furnace wall. The composition showed an amount of rebound or lost material of only 17%.

The periclase used in the above example had the following typical chemical analysis: 1.1% CaO, 2.1% $SiO_2$, 0.3% $Al_2O_3$, 0.4% $Fe_2O_3$, 0.3% $Cr_2O_3$ and 95.8% MgO (by difference). The chromite had the following typical chemical analysis: 21.6% MgO, 0.8% CaO, 5.5% $SiO_2$, 27.9% $Al_2O_3$, 14.3% $Fe_2O_3$ and 29.9% $Cr_2O_3$.

*Example 2*

A composition the same as that of Example 1 but having 1.7 parts $NaH_2PO_4$ and 1.5 parts "SQ" was similarly gunned, showing a rebound of 26%. This second composition showed a strength of 32 p.s.i. when tested for modulus of rupture at 1260° C. This is to be compared with a composition entirely the same except that 3.2 parts $$NaH_2PO_4$$

and no glassy polyphosphate, this latter composition failing under no load (i.e., the specimen breaking under its own weight) when tested for modulus of rupture at 1260° C. Furthermore, this latter or prior art composition, with no glassy polyphosphate, showed excessive spalling and popping upon heating up after being gunned.

The compositions according to this invention set forth in Examples 1 and 2 can also be compared to prior art compositions according to the aforesaid application SN. 459,919 wherein 6.5 parts of the —100 mesh periclase were replaced with 6.5 parts —100 mesh chrome ore. These prior art compositions of controlled sizings and reactivity of the —100 mesh material gunned adequately, but the inclusion of the fine chromite led to a decrease in high temperature strength, a specimen of such a composition failing under its own weight in a modulus of rupture test at 1260° C.

*Example 3*

Using the periclase and chromite of Example 1, compositions containing 27 parts periclase passing a 6 mesh screen and retained on a 20 mesh screen, 26.9 parts periclase passing a 100 mesh screen, and 42.9 parts chromite passing a 10 mesh screen and retained on a 100 mesh screen were made with the following phosphate additions: (*a*) 2.0 parts $NaH_2PO_4$ and 1.2 parts "Glass H"; (*b*) 1.5 parts $NaH_2PO_4$ and 1.7 parts "Glass H"; and (*c*) 1.0 part $NaH_2PO_4$ and 2.2 parts "Glass H." "Glass H" is the trade name of a glassy sodium polyphosphate manufactured by FMC Corporation and having an average chain length of from 26 to 30 phosphorous atoms. These three compositions all gunned well and showed no popping or explosion during heat up. However, when tested for modulus of rupture at 1260° C., composition (*a*) had a strength of 108 p.s.i., composition (*b*) had a strength of 41 p.s.i., and composition (*c*) failed under no load (i.e., under its own weight). Thus, it can be seen that excessive amounts of glassy polyphosphate, particularly a long chain glassy phosphate, in comparison to the amount of $NaH_2PO_4$ present, lead to poor strengths at elevated temperatures.

In comparing the modulus of rupture at room temperature of gunned specimens of Examples 1, 2 and 3, it was found that Example 1 had a strength of 550 p.s.i., Example 2 of 710 p.s.i. and the three compositions of Example 3 showed strengths of 345 p.s.i., 305 p.s.i. and 280 p.s.i. respectively. Thus, it can be seen that the compositions with a glassy polyphosphate of shorter chain length exhibited better strengths at room temperature. Also, the strengths of the three specimens of Example 3 decreased as the amount of glassy phosphate increased in relation to the amount of MSP.

In the specification and claims, percentages and parts are by weight unless otherwise indicated. Mesh sizes referred to herein are Tyler standard screen sizes which are defined in Chemical Engineers' Handbook, John H. Perry, editor-in-chief, third edition, 1950, published by McGraw-Hill Book Company, at page 963. For example, a size passing a 100 mesh screen corresponds to 147 microns, and that passing 200 mesh, to 74 microns. Analyses of mineral components are reported in the usual manner, expressed as simple oxides, e.g., MgO, $SiO_2$, although the components may actually be present in various combinations, e.g., as a magnesium silicate.

Having now described the invention, what is claimed is:

1. In a refractory composition consisting essentially of refractory aggregate, from 0 to 2% by weight plasticizer, and, as cold setting bond, a finely divided reactive alkaline earth metal oxide containing compound and $$NaH_2PO_4$$

the improvement wherein said composition also contains a glassy alkali metal polyphosphate in an amount from 10% to 200% of the weight of the $NaH_2PO_4$.

2. A composition according to claim 1 wherein said finely divided reactive alkaline earth metal oxide containing compound substantially all passes a 100 mesh screen.

3. A refractory composition according to claim 1 wherein said glassy alkali metal polyphosphate is a sodium polyphosphate.

4. A refractory composition according to claim 1 wherein said glassy polyphosphate has an average chain length of about 6 phosphorous atoms.

5. A refractory composition according to claim 1 having a total $P_2O_5$ content not greater than 3%.

6. A refractory composition according to claim 1 wherein said reactive alkaline earth metal oxide containing compound is magnesia passing a 100 mesh screen.

7. A refractory composition according to claim 1 wherein there is present from 1% to 5% by weight $$NaH_2PO_4$$

from 5% to 35% by weight magnesia passing a 100 mesh screen, from 0.1% to 2% of a glassy sodium polyphosphate, and from 0 to 2% plasticizer, the balance of the composition being refractory aggregate.

8. A refractory composition according to claim 7 wherein said aggregate is periclase.

9. A refractory composition according to claim 7 having a total $P_2O_5$ content not greater than 3% by weight.

10. A refractory composition according to claim 7 wherein said sodium polyphosphate has an average chain length of about 6 phosphorous atoms.

11. A refractory composition according to claim 7 containing from 1% to 2% by weight plasticizer.

12. A refractory composition according to claim 10 wherein said plasticizer is bentonite.

References Cited

UNITED STATES PATENTS 2,479,504   8/1949   Moore et al. _____ 106—58
3,278,320   10/1966  Neely et al. _____ 106—58

TOBIAS E. LEVOW, *Primary Examiner.*

HELEN M. McCARTHY, *Examiner.*

J. E. POER, *Assistant Examiner.*